United States Patent
Mori et al.

(10) Patent No.: US 8,817,922 B2
(45) Date of Patent: Aug. 26, 2014

(54) WIRELESS RECEIVING APPARATUS AND METHOD

(75) Inventors: Hiroki Mori, Kawasaki (JP); Masaki Ogata, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 177 days.

(21) Appl. No.: 13/599,540

(22) Filed: Aug. 30, 2012

(65) Prior Publication Data

US 2013/0058442 A1  Mar. 7, 2013

(30) Foreign Application Priority Data

Sep. 7, 2011  (JP) ................................. 2011-195228

(51) Int. Cl.
*H04L 27/00* (2006.01)
(52) U.S. Cl.
USPC .......................................................... 375/343
(58) Field of Classification Search
USPC .................................. 375/316, 324, 343, 346
See application file for complete search history.

(56) References Cited

U.S. PATENT DOCUMENTS

| | | | |
|---|---|---|---|
| 6,781,446 B2 | 8/2004 | Furman et al. | |
| 8,054,920 B2 * | 11/2011 | Furman et al. | 375/344 |
| 8,059,767 B2 * | 11/2011 | Furman et al. | 375/344 |

* cited by examiner

*Primary Examiner* — Jaison Joseph
(74) *Attorney, Agent, or Firm* — Holtz Holtz Goodman & Chick PC

(57) ABSTRACT

According to one embodiment, a wireless receiving apparatus a calculation module, a detection module and a determination module. The calculation module calculates, for each of modes, correlation values between a received signal and reference signals. The detection module synthesizes the correlation values to generate first correlation value sequences for each of the modes, and to detect at least one second correlation value sequence. The determination module selects a known signal period from the signal periods and a known signal interval from the signal intervals, based on first correlation values included in the second correlation value sequence, and to determine a received signal mode.

8 Claims, 4 Drawing Sheets

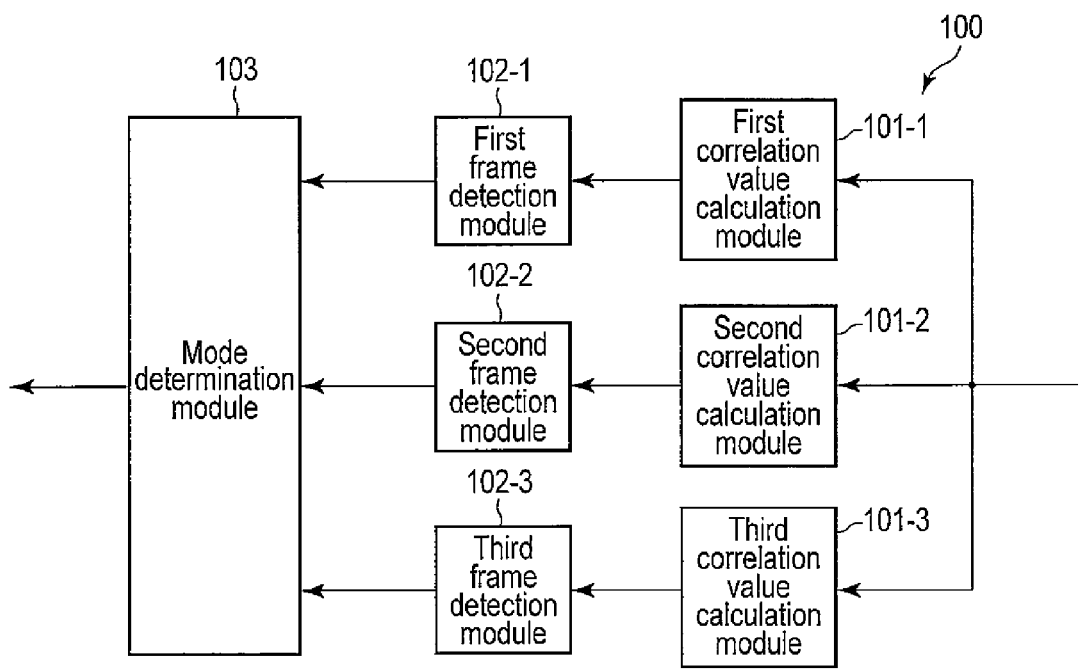
F I G. 1

| Data rate [bps] | Interleaver length | | | |
|---|---|---|---|---|
| | Short | | Long | |
| | D1 | D2 | D1 | D2 |
| 75 | 7 | 5 | 5 | 5 |
| 150 | 7 | 4 | 5 | 4 |
| 300 | 6 | 7 | 4 | 7 |
| 600 | 6 | 6 | 4 | 6 |
| 1200 | 6 | 5 | 4 | 5 |
| 2400 (for data) | 6 | 4 | 4 | 4 |
| 2400 (for sound) | 7 | 7 | — | — |
| 4800 | 7 | 6 | — | — |

F I G. 4

WIRELESS RECEIVING APPARATUS AND METHOD

CROSS-REFERENCE TO RELATED APPLICATIONS

This application is based upon and claims the benefit of priority from Japanese Patent Application No. 2011-195228, filed Sep. 7, 2011, the entire contents of which are incorporated herein by reference.

FIELD Embodiments described herein relate generally to a wireless receiving apparatus and method.

BACKGROUND

In conventional wireless receiving devices, a preamble signal at the head of a frame is received to thereby demodulate a control signal included in the preamble signal. By this process, parameter elements applied to a data portion subsequent to the preamble portion can be grasped to appropriately demodulate a data signal in the data portion.

However, frames are received not always beginning with their leading portions, and there may be a case where no preamble signal is received. In this case, the mode (structure) of each frame cannot be determined, which makes it difficult to perform appropriate demodulation. To avoid it, there is a method of determining the mode of a received signal, utilizing the features (such as the length, interval and cycle of a known signal) of frames corresponding to respective modes assumed for the signal.

BRIEF DESCRIPTION OF THE DRAWINGS

FIG. 1 is a block diagram illustrating a wireless receiving apparatus according to an embodiment;

FIG. 4 is a table showing the relationship between the data rate, the interleaver length and the sequence.

DETAILED DESCRIPTION

Figure 2:
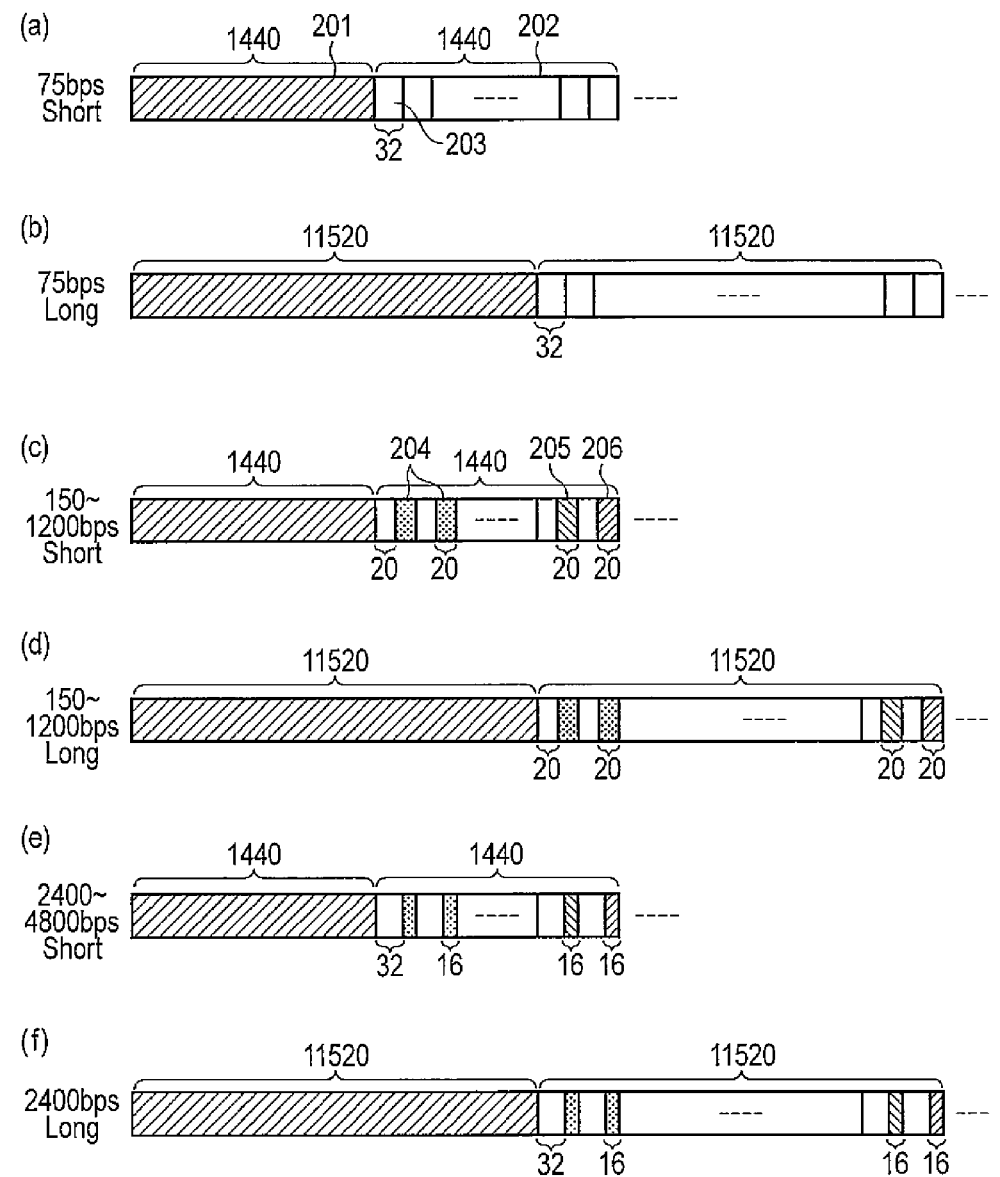
FIG. 2 is a view illustrating a frame structure according to MIL standards.

When the mode of a received signal is determined utilizing a frame feature, there is a case where frames corresponding to a plurality of modes are detected, and in this case, it is difficult to determine a single mode. Further, to reduce a frame detection missing rate in a low signal-to-noise ratio (SNR), it may be effective to reduce a threshold for frame detection. However, in this case, the problem involved when frames corresponding to a plurality of modes are detected becomes more conspicuous.

In general, according to one embodiment, a wireless receiving apparatus includes a calculation module, a detection module and a determination module.

The calculation module is configured to calculate, for each of modes, correlation values between a received signal and reference signals, the received signal being received at the apparatus, the modes being determined from signal periods of known signals and signal intervals of the known signals, each signal interval indicating the interval between adjacent known signals in a frame of the received signal, each signal period indicating a period required for the same known signal to reappear in the frame, the reference signals corresponding to at least one of sequences having a possibility of being used for the known signals inserted in frames. The detection module is configured to synthesize the correlation values to generate first correlation value sequences for each of the modes, and to detect at least one second correlation value sequence, the second correlation value sequence being included in the first correlation value sequences and having a highest correlation value not less than a first threshold. The determination module is configured to select a known signal period from the signal periods and a known signal interval from the signal intervals, based on first correlation values included in the second correlation value sequence, and to determine a received signal mode based on the selected known signal period and the selected known signal interval, the received signal mode being a mode of the received signal.

A wireless receiving apparatus and method according to an embodiment will be described with reference to the accompanying drawings.

The following descriptions are based on the MIL-STD-188-110b standards (hereinafter, "MIL-STD"). However, the frames received by the apparatus of the embodiment are not limited to MIL frames, but may be extended to those based on the Standardization Agreement (STANAG) standards (hereinafter, "STANAG standards"), or on other wireless communication standards obtained by modifying the MIL or STANAG standards.

Referring to FIG. 1, a wireless receiving apparatus 100 according to the embodiment will be described.

The wireless receiving apparatus 100 comprises a first correlation value calculation module 101-1, a second correlation value calculation module 101-2, a third correlation value calculation module 101-3, a first frame detection module 102-1, a second frame detection module 102-2, a third frame detection module 102-3, and a mode determination module 103.

The first correlation value calculation module 101-1 calculates correlation values associated with a received signal, based on a data rate for a mode "low." For instance, correlators (not shown) for the mode "low" are prepared for respective sequences (i.e., known signals) and used to perform correlation processing based on the known signals, thereby calculating correlation values. As the sequences, Walsh-Hadamard sequences having a code length of 32 are used.

The second correlation value calculation module 101-2 calculates correlation values based on a data rate set for a mode "mid," like the first correlation value calculation module 101-1.

The third correlation value calculation module 101-3 calculates correlation values based on a data rate set for a mode "high," like the first correlation value calculation module 101-1.

Although FIG. 1 shows a case where received signal components of different modes are sent to the respective correlators corresponding to the modes, thereby calculating correlation values in parallel, the embodiment is not limited to this, but may be modified such that one correlator sequentially changes reference signals corresponding to the sequences to thereby calculate correlation values corresponding to the sequences.

The first frame detection module 102-1 receives correlation values from the first correlation value calculation module 101-1 and synthesizes the correlation values to obtain a correlation value sequence. After that, it detects, based on the correlation values included in the correlation value sequence, whether or not a frame corresponding to the mode "low" has been received.

The second frame detection module 102-2 receives correlation values from the second correlation value calculation module 101-2 and synthesizes the correlation values to obtain a correlation value sequence. After that, it detects, based on the correlation values included in the correlation value sequence, whether or not a frame corresponding to the mode "mid" has been received.

Similarly, the third frame detection module 102-3 receives correlation values from the third correlation value calculation module 101-3 and synthesizes the correlation values to obtain a correlation value sequence. After that, it detects, based on the correlation values included in the correlation value sequence, whether or not a frame corresponding to the mode "high" has been received.

The mode determination module 103 receives, from the first to third frame detection modules 102-1 to 102-3, the detection results and their respective correlation values, and performs mode determination based on the detection result and the correlation values, thereby outputting mode determination results.

Referring then to FIG. 2, a description will be given of frame structures corresponding to the MIL standards and employed in the embodiment. (a) to (f) of FIG. 2 show all patters of frames that have structures corresponding to the MIL standards and serve as reception targets of the wireless receiving apparatus 100.

The MIL standards support 8 data rates, such as 75 bit per second (bps), 150 bps, 300 bps, 600 bps, 1200 bps, 2400 bps (audio), 2400 bps (data), and 4800 bps. The MIL standards also support two interleaver lengths (Short and Long). Different data rates and interleaver lengths make different frame structures. For convenience sake, an interleaver having a short interleaver length will be referred to as a "short interleaver," and an interleaver having a long interleaver length will be referred to as a "long interleaver."

Each frame structure includes a preamble signal portion 201 as a leading portion, and a data signal portion 202 subsequent thereto. The data signal portion 202 at least includes data blocks 203, and also includes, depending upon the data rate, training blocks (also referred to as known signals) 204, a control signal D1 205 and a control signal D2 206.

The preamble signal portion 201 as the leading portion of the frame is varied in length in accordance with the interleaver length applied. In the case of the short interleaver, the preamble signal portion 201 has a length of 1440 symbols (corresponding to 0.6 seconds), while in the case of the long interleaver, it has a length of 11520 symbols (corresponding to 4.8 seconds).

The data signal portion 202 is demodulated per block size, and the block size is determined from the interleaver length applied. In the case of the short interleaver, the block size is 1440 symbols (corresponding to 0.06 seconds), while in the case of the long interleaver, it is 11520 symbols (corresponding to 4.8 seconds).

In the data signal portion 202, the block having its size determined from the interleaver length is called an interleaver block. As shown in (a) to (f) of FIG. 2, the interleaver block structure of the data signal portion 202 is varied in accordance with the data rate and the interleaver length.

(a) and (b) of FIG. 2 show the cases where the data rate is set to 75 bps, (a) indicating a short interleaver case, and (b) indicating a long interleaver case. The frames shown in (a) and (b) of FIG. 2 are each formed of the data blocks 203 only, and have no training blocks 204. One of the four sequences is assigned to the data blocks 203 in units of 32 symbols. Accordingly, in the short interleaver shown in (a) of FIG. 2, the interleaver block includes 45 data blocks 203, while in the long interleaver shown in (b) of FIG. 2, the interleaver block includes 360 data blocks 203.

(c) and (d) of FIG. 2 show the cases where the data rate is set to a value within the range of 150 bps to 1200 bps, (c) indicating a short interleaver case, and (d) indicating a long interleaver case. In each of the frames shown in (c) and (d) of FIG. 2, data blocks 203 each formed of 20 symbols and training blocks 204 each formed of 20 symbols are alternately arranged. Further, the last two training blocks 204 in the interleaver block are formed of the control signal D1 205 and the control signal D2 206, respectively. Accordingly, in the short interleaver (c), 36 data blocks 203 and 36 training blocks 204 are included in the interleaver block, and the $35^{th}$ and $36^{th}$ training blocks 204 are formed of the control signal D1 205 and the control signal D2 206, respectively. Similarly, in the long interleaver (d), 288 data blocks 203 and 288 training blocks 204 are included in the interleaver block, and the $287^{th}$ and $288^{th}$ training blocks 204 are formed of the control signal D1 205 and the control signal D2 206, respectively.

(e) and (f) of FIG. 2 show the cases where the data rate is set to a value within a range of 2400 bps to 4800 bps, (e) indicating a short interleaver case, and (f) indicating a long interleaver case. In each of the frames shown in (e) and (f) of FIG. 2, data blocks 203 each formed of 32 symbols and training blocks 204 each formed of 16 symbols are alternately arranged. Further, the last two training blocks 204 in the interleaver block are formed of the control signal D1 205 and the control signal D2 206. Accordingly, in the short interleaver (e), 30 data blocks 203 and 30 training blocks 204 are included in the interleaver block, and the $29^{th}$ and $30^{th}$ training blocks 204 are formed of the control signal D1 205 and the control signal D2 206, respectively. Similarly, in the long interleaver (f), 240 data blocks 203 and 240 training blocks 204 are included in the interleaver block, and the $239^{th}$ and $240^{th}$ training blocks 204 are formed of the control signal D1 205 and the control signal D2 206, respectively.

In light of the combination of the data blocks 203 and the training blocks 204 in the interleaver block, the data signal portion 202 can be roughly classified into the three modes, i.e., 75 bps, 150 bps to 1200 bps, and 2400 bps to 4800 bps. In the descriptions below, for convenience sake, the frame of 75 bps will be referred to as a mode "low," the frame of 150 bps to 1200 bps will be referred to as a mode "mid," and the frame of 2400 bps to 4800 bps will be referred to as a mode "high."

Figure 3:
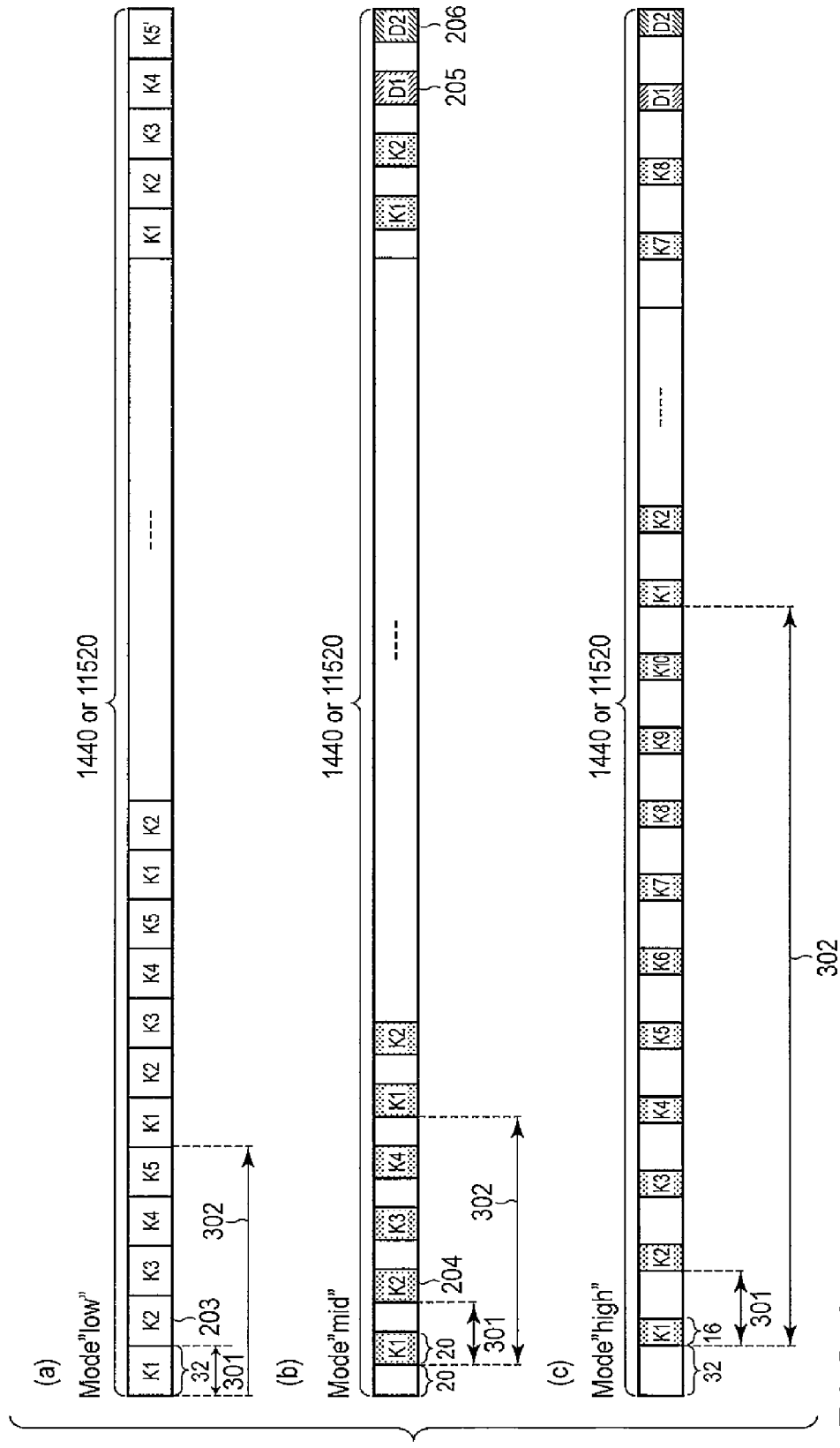
FIG. 3 is a view illustrating the arrangement of known signals in a data frame according to the MIL standards.

Referring then to FIG. 3, a description will be given of the known signals in the interleaver block of the data signal portion in each mode.

In the mode "low," the interleaver block of the data signal portion includes only data blocks. However, since each of the data blocks includes one of the prepared sequences, it is substantially regarded as a known signal. Accordingly, in FIG. 3, a data block K1 includes one of four sequences (sequences 1 to 4) with a code length of 32 symbols, and a data block K2 includes one of four sequences (sequences 5 to 8) with a code length of 32 symbols. Similarly, a data block K3 includes one of sequences 9 to 12, a data block K4 includes one of sequences 13 to 16, and a data block K5 includes one of sequences 17 to 20.

A data block K5' as the last block of the interleaver block includes one of four sequences (sequences 21 to 24) with a code length of 32 symbols, which differ from the four sequences of the data block K5. The one sequence included in each data block is selected from the corresponding four sequences, and is multiplied by two-bit data included in and to be transmitted by the each data block.

From the above, in the mode "low," the total number of known signals is 24 (=four sequences×5 blocks (K1 to K5)+ four sequences×1 block (K5')), the known signal length is 32 symbols, the known signal interval is 32 symbols, and the known signal period (except for the control signals) is 160 symbols. The known signal interval indicates the interval between adjacent ones of the known signals in a frame. The known signal period indicates the period required for the same known signal to reappear in the frame. For instance, in the example of FIG. 3, in the mode "low," a known signal interval 301 is the interval between leading end of the data block K1 and that of the data block K2. A known signal period 302 is the period required for a subsequent data block K1 to appear after a preceding data block K1 appears.

In the mode "mid," a training block K1 in FIG. 3 is formed of a symbol sequence 1 with a code length of 20 symbols, and a training block K2 is formed of a symbol sequence 2 with a code length of 20 symbols. Similarly, a training block K3 is formed of a symbol sequence 3, and a training block K4 is formed of a symbol sequence 4. The control signal D1 in the interleaver block is formed of one of four sequences (sequences D14 to D17) with a code length of 20 symbols. The control signal D2 is formed of one of four sequences (sequences D2_4 to D2_7) with a code length of 20 symbols.

From the above, in the mode "mid," the total number of known signals is 12 (=1×4 blocks (K1 to K4)+4×2 blocks (D1 and D2), and the known signal length is 20 symbols, the known signal interval is 40 symbols, and the known signal period (excluding the control signals) is 160 symbols.

In the mode "high," the training block K1 in FIG. 3 is formed of a sequence 1 with a code length of 16 symbols, and the training block K2 is formed of a sequence 2 with a code length of 16 symbols. Similarly, the training block K3 is formed of a sequence 3, the training block K4 is formed of a sequence 4, the training block K5 is formed of a sequence 5, a training block K6 is formed of a sequence 6, a training block K7 is formed of a sequence 7, a training block K8 is formed of a sequence 8, a training block K9 is formed of a sequence 9, and a training block K10 is formed of a sequence 10. The control signal D1 in the interleaver block is formed of one of four sequences (sequences D14 to D17) each having a code length of 16 symbols. The control signal D2 is formed of one of four sequences (sequences D2_4 to D2_7) each having a code length of 16 symbols.

From the above, in the mode "high," the total number of known signals is 18 (=1×10 blocks (K1 to K10)+4×2 blocks (D1 and D2), the known signal length is 16 symbols, the known signal interval is 48 symbols, and the known signal period (excluding the control signals) is 480 symbols.

Referring then to the table of FIG. 4, a description will be given of the relationship between the sequences applied to the control signals, the data rate and the interleaver length.

The sequences providing the control signals D1 and D2 are determined from the data rate and interleaver length applied to the frame. As shown in FIG. 4, in the case of, for example, the mode "mid," i.e., in the case where the data rate is 1200 bps and the interleaver length is "Long," the sequence D1_4 is applied to the control signal D1, and the sequence D2_5 is applied to the control signal D2. Similarly, in the mode "high," i.e., in the case where the data rate is 2400 bps and the interleaver length is "Short," the control signal D1 is formed of the sequence D1_6, and the control signal D2 is formed of the sequence D2_4.

It should be noted that in the MIL standards, in the mode "mid," the former 16 symbols included in each of the four sequences (D1_4 to D1_7) having a length of 20 symbols assume different values, and the latter 4 symbols assume the common value. The same can be said of the four sequences (D2_4 to D2_7) having a length of 20 symbols and used for the control signal D2.

The correlation process performed in the correlation value calculation module 101 according to the embodiment will now be described.

In the embodiment, the correlation process is described using a method of calculating correlation values based on known signals as reference signals. However, the method employed by the correlation process is not limited to this, but another method of calculating correlation values may be employed. Further, although autocorrelation may be utilized to calculate the correlation values, it should be noted that in the mode "low," known signals are determined in accordance with data, and therefore the periodicity of the known signals are not guaranteed. For instance, when the sequence 1 is used for the first data block K1, it is not always used for the subsequent data block K1.

In a mode U ($\in$ {low, mid, high}), a reference signal based on the known signal of a sequence X is expressed as $r_{U, X}$. For instance, the reference signal based on a sequence 21 in the mode "low" is set to $r_{low, 21}$. Further, the reference signal based on a sequence D2_6 in the mode "high" is set to $r_{high, D2\_6}$.

The correlation value calculation module 101-1 includes correlators having reference signals $r_{low, 1}$ to $r_{low, 24}$. The correlation value calculation module 101-2 includes correlators having reference signals $r_{mid, 1}$ to $r_{mid, 4}$, $r_{mid, D1\_4}$ to $r_{mid, D1\_7}$, and $r_{mid, D2\_4}$ to $r_{mid, D2\_7}$. The correlation value calculation module 101-3 includes correlators having reference signals $r_{high, 1}$ to $r_{high, 10}$, $r_{high, D1\_4}$ to $r_{high, D1\_7}$, and $r_{high, D2\_4}$ to $r_{high, D2\_7}$.

A received signal y(t) as a $t^{th}$ symbol is given by the following equation (1):

$$y(t) = \sum_{l=1}^{L} h_l(t)s(t - \tau_l) + \eta(t) \quad (1)$$

where s is a transformation signal, $h_l$ is the channel response of an $l^{th}$ path (l is a positive integer), $\tau_l$ is the delay time of the $l^{th}$ path, L is the number of paths, and $\eta$ is noise. The first to third correlation value calculation modules 101-1 to 101-3 calculate correlation values between the received signal and the respective reference signals. The correlation value $Z'_{U, X}(t)$ obtained by each correlator based on the reference signal $r_{U, X}$ is given by the following equation (2):

$$Z'_{U,X}(t) = \frac{\left| \sum_{t'=0}^{T_U-1} r^*_{u,X}(t')y(t+t') \right|}{\sqrt{\sum_{t'=0}^{T_U-1} r^*_{u,X}(t')r_{u,X}(t')} \sqrt{\sum_{t'=0}^{T_U-1} y^*(t+t')y(t+t')}} \quad (2)$$

where $T_U$ is a reference signal length (known signal length) in the mode U, and asterisk* indicates a complex conjugate. For instance, $r_{U, X}$ in the equation (2) is the complex conjugate of $r_{U, X}$. The denominator of the equation (2) is a normalization term for scaling the correlation value to a value falling within the range of 0 to 1, and may not be considered.

The operations of the first to third frame detection modules 102-1 to 102-3 will be described.

The first to third frame detection modules 102-1 to 102-3 detect whether or not the received signal is a frame signal of a target mode based on the correlation values $Z'_{U,X}(t)$ calculated therein. For this detection, correlation value synthesis is performed utilizing a known signal period or interval as a feature of each mode, which enables robust frame detection against noise or fading. A description will be given of the processes performed by the first to third frame detection modules 102-1 to 102-3 and corresponding to the respective modes.

<In the Case of Mode "Low">

In the mode "low," correlation values of from $Z'_{low, 1}$ to $Z'_{low, 24}$ calculated by the first correlation value calculation module 101-1 may be used selectively in the process of the first frame detection module 102-1, instead of using all of the correlation values. This is because if, for example, the received signal y(t) is of the mode "low," one of the correlators having reference signals $r_{low, 1}$ to $r_{low, 4}$ provides a high correlation value at the timing of, for example, the data block K1 of the signal, and similarly, one of the correlators having reference signals $r_{low, 13}$ to $r_{low, 16}$ provides a high correlation value at the timing of, for example, the data block K4.

By thus causing a maximum correlation value to be output at a time symbol t from a group of correlators, a high correlation value can be obtained when a desired data block is received, whereby the number of correlation values to be controlled can be reduced.

Specifically, when selective output from a group of correlators is performed, the number of correlation value sequences $M_{low}$ becomes five in the mode "low," and if the $m^{th}$ (m=1 to 5) correlation value sequence is expressed as $Z_{low, m}$, $Z_{low, m}$ is given by the following equation (3):

$$Z_{low,m}(t) = \max(Z'_{low,4(m-1)+1}(t), Z'_{low,4(m-1)+2}(t), \ldots, Z'_{low,4m}(t)), m=1,2,\ldots,5 \quad (3)$$

Regarding the $5^{th}$ correlation value sequence $Z_{low, 5}$, maximum correlation values at respective time symbols t may be selected from a group of 8 correlators having reference signals from $r_{row, 17}$ to $r_{low, 24}$, in consideration of the last data block K5' of the interleaver block. In this case, the $m^{th}$ (m=1 to 5) correlation value sequence $Z_{low}$ is given by the following equation (4):

$$Z_{low,m}(t) = \begin{cases} \max(Z'_{low,4(m-1)+1}(t), Z'_{low,4(m-1)+2}(t), \ldots, Z'_{low,4m}(t)), m = 1, 2, 3, 4 \\ \max(Z'_{low,4(m-1)+1}(t), Z'_{low,4(m-1)+2}(t), \ldots, Z'_{low,4(m+1)}(t)), m = 5 \end{cases} \quad (4)$$

Subsequently, in order to enhance the accuracy of frame detection, correlation value synthesis is performed on the first to fifth correlation value sequences $Z_{low, 1}$ to $Z_{low, 5}$. Firstly, in accordance with the known signal interval, synthesis is performed between correlation value sequences. Assuming that the correlation value obtained in the mode "low" after the synthesis between the correlation value sequences is $C'_{low}$, $C'_{low}$ is given by the following equation (5):

$$C'_{low}(t) = \frac{1}{5} \sum_{m=1}^{5} Z_{low,m}(t + 32 \times (m-1)) \quad (5)$$

The correlation value $C'_{low}$ obtained after the synthesis between the correlation value sequences is subjected to time-domain synthesis in each known signal period by the amount corresponding to a target zone length of N symbols. Desirably, the target zone length N is set to the value given by the following equation (6):

$$N = K_{low} \times 160 \quad (6)$$

where $K_{low}$ is the number of correlation values $C'_{low}$ synthesized in the time domain in the mode "low." Assuming that in the mode "low," the correlation value obtained after the synthesis in the time domain is $C_{low}$, $C_{low}$ is given by the following equation (7):

$$C_{low}(p) = \frac{1}{K_{low}} \sum_{k=1}^{K_{low}} C'_{low}(p + 160 \times (k-1)), p = 1, 2, \ldots, 160 \quad (7)$$

where p is a sample index obtained after the synthesis. If the maximum correlation value of the correlation sample values obtained by the synthesis of the correlation value sequences is not less than a threshold $v^{(1)}_{low}$ as shown in the condition expressed by the following equation (8), the correlation value sequences are output as a detection result indicative of the detection of a frame of the mode "low."

$$\max(C_{low}(p)) \geq v_{low}^{(1)} \quad (8)$$

<In the Case of Mode "Mid">

Since in the mode "mid," one known signal is used for one training block, it is sufficient if the sequence of correlation values $Z'_{mid, 1}$ to $Z'_{mid, 4}$ calculated by the second correlation value calculation module 101-2 are directly used as correlation value sequences for the process of the second frame detection module 102-2. Accordingly, in the mode "mid," the number of correlation value sequences $M_{mid}$ is 4. Assuming that the $m^{th}$ correlation value sequence is $Z_{mid, m}$, $Z_{mid, m}$ is given by the following equation (9):

$$Z_{mid,m}(t) = Z'_{mid,m}(t), m=1,2,\ldots,4 \quad (9)$$

Regarding the third correlation value sequence $Z_{mid, 3}$, the maximum correlation values at the respective time symbols t may be selected from a group of five correlators having reference signals $r_{mid, 3}$ and $r_{mid, D1\_4}$ to $r_{mid, D1\_7}$, in consideration of the control signal block D1. Similarly, regarding the fourth correlation value sequence $Z_{mid, 4}$, the maximum correlation values at the respective time symbols t may be selected from a group of five correlators having reference signals $r_{mid, 4}$ and $r_{mid, D2\_4}$ to $r_{mid, D2\_7}$, in consideration of the control signal block D2. In this case, the $m^{th}$ (m=1 to 4) correlation value sequence $Z_{mid, m}$ is given by the following equation (10):

$$Z_{mid,m}(t) = \begin{cases} Z'_{mid,m}(t), m = 1, 2 \\ \max(Z'_{mid,m}(t), Z'_{mid,D1\_4}(t), \ldots, Z'_{mid,D1\_7}(t)), m = 3 \\ \max(Z'_{mid,m}(t), Z'_{mid,D2\_4}(t), \ldots, Z'_{mid,D2\_7}(t)), m = 4 \end{cases} \quad (10)$$

Thereafter, the first to fourth correlation value sequences $Z_{mid, 1}$ to $Z_{mid, 4}$ are subjected to correlation value synthesis in order to enhance the accuracy of frame detection. Firstly, synthesis is performed between correlation value sequences in accordance with the known signal interval. Assuming that the correlation value obtained after the synthesis between the correlation value sequences in the mode "mid" is $C'_{mid}$, $C'_{mid}$ is given by the following equation (11):

$$C'_{mid}(t) = \frac{1}{4}\sum_{m=1}^{4} Z_{mid,m}(t + 40 \times (m-1)) \qquad (11)$$

The correlation value $C'_{mid}$ obtained after the synthesis between the correlation value sequences is subjected to time-domain synthesis in each known signal period by the amount corresponding to a target zone length of N symbols. Desirably, the target zone length N is set to the value given by the following equation (12):

$$N = K_{mid} \times 160 \qquad (12)$$

where $K_{mid}$ is the number of correlation values $C'_{mid}$ synthesized in the time domain in the mode "mid." Assuming that in the mode "mid," the correlation value obtained after the synthesis in the time domain is $C_{mid}$, $C_{mid}$ is given by the following equation (13):

$$C_{mid}(p) = \frac{1}{K_{mid}}\sum_{k=1}^{K_{mid}} C'_{mid}(p + 160 \times (k-1)), \ p = 1, 2, \cdots, 160 \qquad (13)$$

where p is a sample index obtained after the synthesis. If the maximum correlation value of the correlation sample values obtained by the synthesis of the correlation value sequences is not less than a threshold $v^{(1)}_{mid}$ as shown in the condition expressed by the following equation (14), the correlation value sequences are output as a detection result indicative of the detection of a frame of the mode "low."

$$\max(C_{mid}(p)) \geq v_{mid}^{(1)} \qquad (14)$$

<In the Case of Mode "High">

In the mode "high," since one known signal is used for one training block, it is sufficient if the sequence of correlation values $Z'_{high,\,1}$ to $Z'_{high,\,10}$ calculated by the third correlation value calculation module 101-3 are directly used as correlation value sequences for the process of the second frame detection module 102-3. Accordingly, in the mode "high," the number of correlation value sequences $M_{high}$ is 10. Assuming that the $m^{th}$ correlation value sequence is $Z_{high,\,m}$, $Z_{high,\,m}$ is given by the following equation (15):

$$Z_{high,m}(t) = Z'_{high,m}(t), m=1,2,\ldots,10 \qquad (15)$$

Regarding the ninth correlation value sequence $Z_{high,\,9}$, the maximum correlation values at the respective time symbols t may be selected from a group of five correlators having reference signals $r_{high,\,9}$ and $r_{high,\,D1\_4}$ to $r_{high,\,D1\_7}$, in consideration of the control signal block D1. Similarly, regarding the tenth correlation value sequence $Z_{high,\,10}$, the maximum correlation values at the respective time symbols t may be selected from a group of five correlators having reference signals $r_{high,\,10}$ and $r_{high,\,D2\_4}$ to $r_{high,\,D2\_7}$, in consideration of the control signal block D2. In this case, the $m^{th}$ (m=1 to 10) correlation value sequence $Z_{high,\,m}$ is given by the following equation (16):

$$Z_{high,m}(t) = \begin{cases} Z'_{high,m}(t), m = 1, 2, \cdots, 8 \\ \max(Z'_{high,m}(t), Z'_{high,D1\_4}(t), \cdots, Z'_{high,D1\_7}(t)), m = 9 \\ \max(Z'_{high,m}(t), Z'_{high,D2\_4}(t), \cdots, Z'_{high,D2\_7}(t)), m = 10 \end{cases} \qquad (16)$$

Thereafter, the first to tenth correlation value sequences $Z_{high,\,1}$ to $Z_{high,\,10}$ are subjected to correlation value synthesis in order to enhance the accuracy of frame detection, as in the aforementioned case. Synthesis is performed between correlation value sequences in accordance with the known signal interval. Assuming that the correlation value obtained after the synthesis between the correlation value sequences in the mode "high" is $C'_{high}$, $C'_{high}$ is given by the following equation (17):

$$C'_{high}(t) = \frac{1}{10}\sum_{m=1}^{10} Z_{high,m}(t + 48 \times (m-1)) \qquad (17)$$

The correlation value $C'_{high}$ obtained after the synthesis between the correlation value sequences is subjected to time-domain synthesis in each known signal period by the amount corresponding to a target zone length of N symbols. Desirably, the target zone length N is set to the value given by the following equation (18):

$$N = K_{high} \times 480 \qquad (18)$$

where $K_{high}$ is the number of correlation values $C'_{high}$ synthesized in the time domain in the mode "high." Assuming that in the mode "high," the correlation value obtained after the synthesis in the time domain is $C_{high}$, $C_{high}$ is given by the following equation (19):

$$C_{high}(p) = \frac{1}{K_{high}}\sum_{k=1}^{K_{high}} C'_{high}(p + 480 \times (k-1)), \ p = 1, 2, \cdots, 480 \qquad (19)$$

where p is a sample index obtained after the synthesis. If the maximum correlation value of the correlation sample values obtained by the synthesis of the correlation value sequences is not less than a threshold $v^{(1)}_{high}$ as shown in the condition expressed by the following equation (20), the correlation value sequences are output as a detection result indicative of the detection of a frame of the mode "high."

$$\max(C_{high}(p)) \geq v_{high}^{(1)} \qquad (20)$$

The operation of the mode determination module 103 will now be described.

If the frame detected by the frame detection module 102 shows one mode, the process of the mode determination module 103 is skipped, and the mode shown in the frame is regarded as a determination result.

If the determination result input to the mode determination module 103 indicates "0," i.e., if no frames are detected, the processes of the correlation value calculation module 101 and the frame detection module 102 are continued.

Depending upon the threshold $v^{(1)}_U$ used for detection in the frame detection module 102, a frame with a plurality of modes may be detected. In this embodiment, assuming that the mode(s) of the frame detected by the frame detection module 102 is U' ($\in$ {low, mid, high}), and that the time index of the sample at which the frame of the mode U' is detected is $p_{U'}^{(1)}$, $p_{U'}^{(1)}$ is given by the following equation (21):

$$p_{U'}^{(1)} = \arg\max_p (C_{U'}(p)) \qquad (21)$$

In this case, the mode determination module 103 may focus attention on the correlation value $C_{U'}(p_{U'}^{(1)})$ of the time index $p_{U'}^{(1)}$ as the sampling point of the frame detection to compare the correlation values of different modes, thereby using the mode having a maximum correlation value as the mode determination result. Further, when a plurality of modes are detected, if the difference between the maximum values of the correlation value sequences of the upper two modes is not less than a threshold, the mode of the correlation value sequence having a higher maximum correlation value may be used as the mode determination result. For instance, when the frame detection module 102 detects both the mode "low" and mode "mid," if the difference between the maximum values of the correlation value sequences of the mode "low" and the mode "mid" is not less than a threshold, the mode determination module 103 determines that the mode "low" having a higher maximum correlation value is the mode of the received signal.

Alternatively, mode determination may be performed by focusing attention on the correlation value sequence $Z_{U', m}$ instead of the correlation value $C_{U'}$ after synthesis. More specifically, as expressed by the following mathematical expression (22), attention is focused on all samples of the correlation value sequence $Z_{U', m}$ corresponding to the time index $\{p_{U'}^{(1)}+(m-1)\tau_{U'}^{(RI)}+(k-1)\tau_{U'}^{(RC)}\}$ in the target zone length N in the mode U'.

$$Z_{U',m}(p_{U'}^{(1)} + (m-1)\tau_{U'}^{RI} + (k-1)\tau_{U'}^{RC}),\ m = 1, 2, \cdots, M_{U'} \quad (22)$$
$$k = 1, 2, \cdots, K_{U'}$$

where $\tau_{U'}^{(RI)}$ is a known signal interval in the mode U', and $\tau_{U'}^{(RC)}$ is a known signal period in the mode U'. In the true mode included in the plurality of modes detected during frame detection, the samples obtained within the time period starting from $p_{U'}^{(1)}$, as given by the mathematical expression (22), must provide higher correlation values than the other samples. In contrast, in an untrue mode, even the samples obtained within the time period starting from $p_{U'}^{(1)}$ do not always provide high correlation values.

Finally, using the samples at the points $M_{U'} \times K_{U'}$ given by the mathematical expression (22), the percentage of sampling points at which correlation values are less than a threshold $v^{(1')}_{U'}$ is calculated, thereby setting, as the mode determination result, the mode in which the percentage is smallest. Alternatively, the percentage of the sampling points at which correlation values are not less than the threshold $v^{(1')}_{U'}$ may be calculated, thereby setting, as the mode determination result, the mode in which the percentage is largest. Yet alternatively, the variance of the correlation values of the samples at the points $M_{U'} \times K_{U'}$ may be calculated, whereby the mode with the smallest variance be used as the mode determination result.

Modification of the Embodiment

In the wireless receiving apparatus 100 of the above-described embodiment, correlation values associated with all modes are calculated to thereby determine which one of the modes a received signal has. However, the wireless receiving apparatus 100 may be modified to calculate only one mode.

More specifically, the wireless receiving apparatus 100 shown in, for example, FIG. 1 may comprise only the correlation value calculation module 101-1, the first frame detection module 102-1 and the mode determination module, instead of the plurality of correlation value calculation modules and frame detection modules corresponding to all modes. In this apparatus 100, it is determined only whether or not the received signal is of the mode "low." By virtue of this structure, only a signal of a desired mode can be received and a signal of an unsuitable mode can be rejected, i.e., a received signal can be selected. Further, in this case, it is sufficient if only the configuration of the needed mode is included, and therefore the circuitry can be simplified in structure and be reduced in scale.

In the above-described wireless receiving apparatus of the embodiment, when the mode of a received signal is determined utilizing the features of frames corresponding to modes, correlation values are calculated for the received signal, and frame detection is performed based on the calculated correlation values to perform mode determination, with the result that the mode of the received signal can be determined even if the preamble signal cannot be received.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless receiving apparatus comprising:
   a calculation module configured to calculate, for each of modes, correlation values between a received signal and reference signals, the received signal being received at the apparatus, the modes being determined from signal periods of known signals and signal intervals of the known signals, each signal interval indicating the interval between adjacent known signals in a frame of the received signal, each signal period indicating a period required for the same known signal to reappear in the frame, the reference signals corresponding to at least one of sequences having a possibility of being used for the known signals inserted in frames;
   a detection module configured to synthesize the correlation values to generate first correlation value sequences for each of the modes, and to detect at least one second correlation value sequence, the second correlation value sequence being included in the first correlation value sequences and having a highest correlation value not less than a first threshold; and
   a determination module configured to select a known signal period from the signal periods and a known signal interval from the signal intervals, based on first correlation values included in the second correlation value sequence, and to determine a received signal mode based on the selected known signal period and the selected known signal interval, the received signal mode being a mode of the received signal.

2. The apparatus according to claim 1, wherein
   the at least one second correlation value sequence includes a plurality of second correlation value sequences;
   the plurality of second correlation value sequences include a third correlation value sequence including a highest correlation value among correlation values of the second correlation value sequences;
   the plurality of second correlation value sequences include a fourth correlation value sequence including a second highest correlation value among the correlation values of the second correlation value sequences; and
   the determination module determines, if a difference between the highest correlation value and the second highest correlation value is not less than a second threshold, a mode of the third correlation value sequence as the received signal mode.

3. The apparatus according to claim 1, wherein if the at least one second correlation value sequence includes a plurality of second correlation value sequences, the determination module determines, as the received signal mode, a mode of correlation value sequence that a percentage of second correlation values less than a third threshold is smallest, the second correlation values being calculated using sampling points at which the known signals are received.

4. A wireless receiving apparatus comprising:
a calculating unit configured to calculate, for a mode, correlation values between a received signal and reference signals, the received signal being received at the apparatus, the modes being determined from signal periods of known signals and signal intervals of the known signals, each signal interval indicating the interval between adjacent known signals in a frame of the received signal, each signal period indicating a period required for the same known signal to reappear in the frame, the reference signals corresponding to at least one of sequences having a possibility of being used for the known signals inserted in frames;
a detection module configured to synthesize the correlation values to generate first correlation value sequence, and to detect a second correlation value sequence having a highest correlation value not less than a first threshold; and
a determination module configured to determine whether or not a mode of the received signal is an assumed mode, based on correlation values of the second correlation value sequence, the known signal period, and the known signal interval.

5. The apparatus according to claim 4, wherein the determination module determines that, if a percentage of second correlation values less than a second threshold is not more than a third threshold, a mode of the second correlation value sequence is the assumed mode, the second correlation values being calculated using sampling points at which the known signals are received.

6. A wireless receiving method comprising:
calculating, for each of modes, correlation values between a received signal and reference signals, the received signal being received at the apparatus, the modes being determined from signal periods of known signals and signal intervals of the known signals, each signal interval indicating the interval between adjacent known signals in a frame of the received signal, each signal period indicating a period required for the same known signal to reappear in the frame, the reference signals corresponding to at least one of sequences having a possibility of being used for the known signals inserted in frames;
synthesizing the correlation values to generate first correlation value sequences for each of the modes, and to detect at least one second correlation value sequence, the second correlation value sequence being included in the first correlation value sequences and having a highest correlation value not less than a first threshold; and
selecting a known signal period from the signal periods and a known signal interval from the signal intervals, based on first correlation values included in the second correlation value sequence, to determine a received signal mode based on the selected known signal period and the selected known signal interval, the received signal mode being a mode of the received signal.

7. The method according to claim 6, wherein
the at least one second correlation value sequence includes a plurality of second correlation value sequences;
the plurality of second correlation value sequences include a third correlation value sequence including a highest correlation value among correlation values of the second correlation value sequences;
the plurality of second correlation value sequences include a fourth correlation value sequence including a second highest correlation value among the correlation values of the second correlation value sequences; and
the selecting the known signal period determines, if a difference between the highest correlation value and the second highest correlation value is not less than a second threshold, a mode of the third correlation value sequence as the received signal mode.

8. The method according to claim 6, wherein if the at least one second correlation value sequence includes a plurality of second correlation value sequences,
the selecting the known signal period determines, as the received signal mode, a mode of correlation value sequence that a percentage of second correlation values less than a third threshold is smallest, the second correlation values being calculated using sampling points at which the known signals are received.

* * * * *